(12) United States Patent
Luo et al.

(10) Patent No.: US 8,094,624 B2
(45) Date of Patent: Jan. 10, 2012

(54) METHOD AND APPARATUS FOR MINIMIZING PACKET TRANSMISSION LOSS IN A WIRELESS NETWORK

(75) Inventors: Haiyun Luo, San Jose, CA (US); Jitao Fan, Beijing (CN)

(73) Assignee: Aruba Networks Cayman, Grand Cayman (KY)

( * ) Notice: Subject to any disclaimer, the term of this patent is extended or adjusted under 35 U.S.C. 154(b) by 794 days.

(21) Appl. No.: 12/220,984

(22) Filed: Jul. 30, 2008

(65) Prior Publication Data

US 2010/0027464 A1    Feb. 4, 2010

(51) Int. Cl.
*H04W 4/00* (2009.01)

(52) U.S. Cl. ........ 370/333; 370/242; 370/246; 370/332; 370/465

(58) Field of Classification Search .................. None
See application file for complete search history.

(56) References Cited

U.S. PATENT DOCUMENTS

| | | | |
|---|---|---|---|
| 7,336,634 | B2 | 2/2008 | del Prado et al. |
| 2004/0054947 | A1 | 3/2004 | Godfrey |
| 2007/0153745 | A1 | 7/2007 | Sun et al. |

OTHER PUBLICATIONS

I. Haratcherev et al., "Hybrid Rate Control for IEEE 802.11" MOBIWAC'04, Oct. 1, 2004 Phila. PA., Paragraph 3.
J. Pavon & S. Choi, "Link Adaptation Strategy for IEEE 802.11 WLAN Via Received Signal Strength Measurement", p. 6, IV.B.
G.Holland, N. Vaidya & P.Bahl, "A Rate-Adaptive MAC Protocol for Multi-Hop Wireless Networks", ACM/IEEE Int. Conf. on Mobile Computing & Networking,Rome,Italy 2001,Paragraph 3.
M.Lacage, M.Manshaei & T.Turletti "IEEE 802.11 Rate Adaptation: A Practical Approach", Inria Planete Project, 2004, Sophia Antipolis, France. Paragraph 4.
D.Qiao & S. Choi, "Fast-Responsive Link Adaptation for IEEE 802. 11 WLANS", 0-7803-8938-7.05 IEEE, Section IIA-B.
C.Chen, H.Luo, E.Seo, N.Vaidya & X.Wang, "Rate-Adaptive Framing for Interfered Wireless Networks", Dept. of Computer Science, UIUC, Section IV.
S.Wong, H.Yang,S.Lu & V.Bharghavan, "Robust Rate Adaptation for 802.11 Wireless Networks", MOBICON, Sep. 23-26, 2006, Section 5, p. 151-154.
J.Zhang, K.Tan, J.Zhao, H.Wu & Y.Zhang,"A Practical SNR-Guided Rate Adaptation", Section IIIB.

*Primary Examiner* — Donald Mills
(74) *Attorney, Agent, or Firm* — Blakely, Sokoloff, Taylor & Zafman LLP

(57) ABSTRACT

A wireless communication device, such as a wireless router or access point, transmits and receives signals according any one of several standard or proprietary wireless protocols and automatically adapts its transmission rate according to the condition of a link or channel over which it is sending and receiving signals. A packet delay value is used to calculate the maximum number of packet retransmissions that are acceptable given a particular application. The packet retransmission value is used to calculate a maximum acceptable packet loss value which is then compared against actual packet losses to determine whether or not to change the packet transmission rate. If it is determined that the actual packet losses are less than the maximum acceptable value, then the packet transmission rate can be changed to a higher rate and if it is determined that the actual packet losses are greater than the maximum acceptable value, then the packet transmission rate can be changed to be a lower rate.

17 Claims, 3 Drawing Sheets

METHOD AND APPARATUS FOR MINIMIZING PACKET TRANSMISSION LOSS IN A WIRELESS NETWORK

FIELD OF THE INVENTION

This disclosure relates generally to the area of packet transmission in a wireless communications environment and specifically to adapting the packet transmission rate in a wireless device depending upon the current condition of a communications link.

BACKGROUND

Recent advances in wireless network packet transmission speed and range have enabled many new exciting wide-area audio and or video applications. For example, it is now practical to install wireless mobile surveillance networks to improve safety and emergency response times in office and residential campus settings, for surveillance in city streets, oil and mine fields, warehouses, and factory floors. Wireless IPTV has emerged to reach mass mobile handheld devices on the street in real time and Web 2.0 based, multimedia-rich computing and communications are flourishing on intelligent wireless devices for instant information sharing and retrieval. In order to maintain a high level of performance, the typical goal of such wireless, multimedia applications is to maximize throughput in terms of the product of the transmission rate and the frame receipt success ratio (frames received/time period).

One of the problems associated with using wireless, mobile devices to receive multimedia signals is that the condition of the radio link between a transmitting device and a receiving device can change depending upon whether either or both of the devices are in motion, depending upon environmental conditions and the proximity to other devices broadcasting in the same frequency band. The varying condition of the signal is due in large part to interference from other wireless devices, to obstructions to the radio signal that exist in the environment and is due to the distance between the transmitting and receiving devices. Wireless transmission technologies that are implemented on wireless, mobile devices which run multimedia applications have been developed to operate at multiple different transmission rates in order to accommodate the changing signal conditions, and some of these different transmission rates can employ different modulation schemes depending upon the rates susceptibility to interference. So, for instance, a BPSK modulation scheme, which is robust in the presence of interference, can be employed for relatively lower link rates and OFDM, which is robust in the presence of multipath distortion can be employed as a modulation scheme for high link rates. Also, the QPSK module scheme is suitable for higher link rates and operates with higher power and so the signals can be transmitted over greater distances.

A number of wireless audio/video applications are available that are based on wireless technology such as the IEEE 802.11 standards. The 802.11 standards have been extended to provide a number of different link rates at which signals can be transmitted. So, for instance, 802.11b signals can be transmitted at 1 Mbps, 2 Mbps, 5.5 Mbps or 11 MBps with the transmission rate largely dependent upon the signal to noise/interference ratio (SINR) measured at a receiver. Dynamic rate control methods are used to make the SINR measurements and to automatically change the transmission rate so as to maximize throughput. Such dynamic rate control methods are typically referred to as automatic transmission rate adaptation or simply rate adaptation. As the SINR increases, a rate adaptation method can operate to automatically increase the packet transmission rate.

Rate adaptation methods usually achieve their design goal fairly well, and differ only in the details with respect to how the channel quality is evaluated and predicted, with respect to how to measure the frame loss ratios, and how to increase or decrease the channel rate. Popular throughput evaluation tools, e.g., iperf that derives throughput by blasting UDP or TCP traffic, do report good throughput results. While such rate adaptation methods work well for non-real-time traffic, this is not the case with real-time traffic. For real-time traffic transport, the optimal throughput or the channel-rate frame-success-ratio product does not necessarily translate to the best video playback quality. In fact, all existing rate adaptation methods perform poorly for video streaming, for instance. Video mosaic is often observed in the playback due to excessive random frame losses. Chunky and shaking images are frequent due to the losses of synchronization followed by lengthy re-synchronizations to the video source. The fundamental problem is that when the gap between two neighboring rates is large, rate adaptation methods favor the higher rate even though the packet loss ratio is relatively high. In the IEEE 802.11 standard, for example, the overall throughput (or channel-rate-frame-success-ratio product) at the 9 Mbps packet transmission rate is higher, with packet loss ratio up to 38%, compared with the maximum throughput possible at the 6 Mbps packet transmission rate with a packet loss ratio of zero. As a result, all existing throughput-optimizing rate adaptation methods select a higher packet transmission rate, even when the packet loss ratio is as high as 23% to 38%, before the next lower rate is considered. Consequently, the wireless networks tend to stabilize in a state where the packet loss ratios, perceived by the end-to-end real-time transport, are orders of magnitudes higher than those in wired networks. Designed to optimize throughput in wired networks where the incidence of packet loss is usually much lower, existing video decoders are not able to operate in a wireless environment to process real-time streams of video information, where the incidence of packet loss is high, such that the video is high and is played without artifacts.

As opposed to overall packet throughput, packet delay and packet loss are more important parameters to manage for the optimum operation of a wireless, real-time multimedia application. So, in lieu of the limitations to existing throughput based rate adaptation methods, it would be advantageous if the model according to which a rate adaptation method is designed is based upon parameters most critical to the optimum operation of a wireless, real-time multimedia application; namely, the packet delay and packet loss parameters.

INVENTION SUMMARY

Implementing a rate adaptation method that selects a packet transmission rate based on a packet transmission loss parameter significantly lowers the number of packets that are lost during transmission which has the beneficial result of improving the video playback quality. The packet transmission loss parameter can be calculated based upon a packet transmission delay budget that is selected or assigned according to the packet delay requirement specified by a video application.

In one embodiment, a wireless, mobile multimedia device implements a method for automatically adapting the packet transmission rate by employing a packet delay and packet loss budget to pre-calculate a packet retry limit and a packet transmission loss rate limit for each of the transmission rates supported by the wireless device; one of the transmission rates is selected to be the initial transmission rate and the calculated packet retry limit for the selected transmission rate is selected to be the initial limit; all packet transmission failures and successes over some period of time are detected and stored and are used to calculate a current packet transmission loss rate; the current packet transmission loss rate is compared with the pre-calculated packet transmission loss rate limit and the initial packet transmission rate is changed to a lower rate if the calculated current packet transmission loss rate is higher than the initially set packet transmission loss limit.

DETAILED DESCRIPTION

Figure 1:
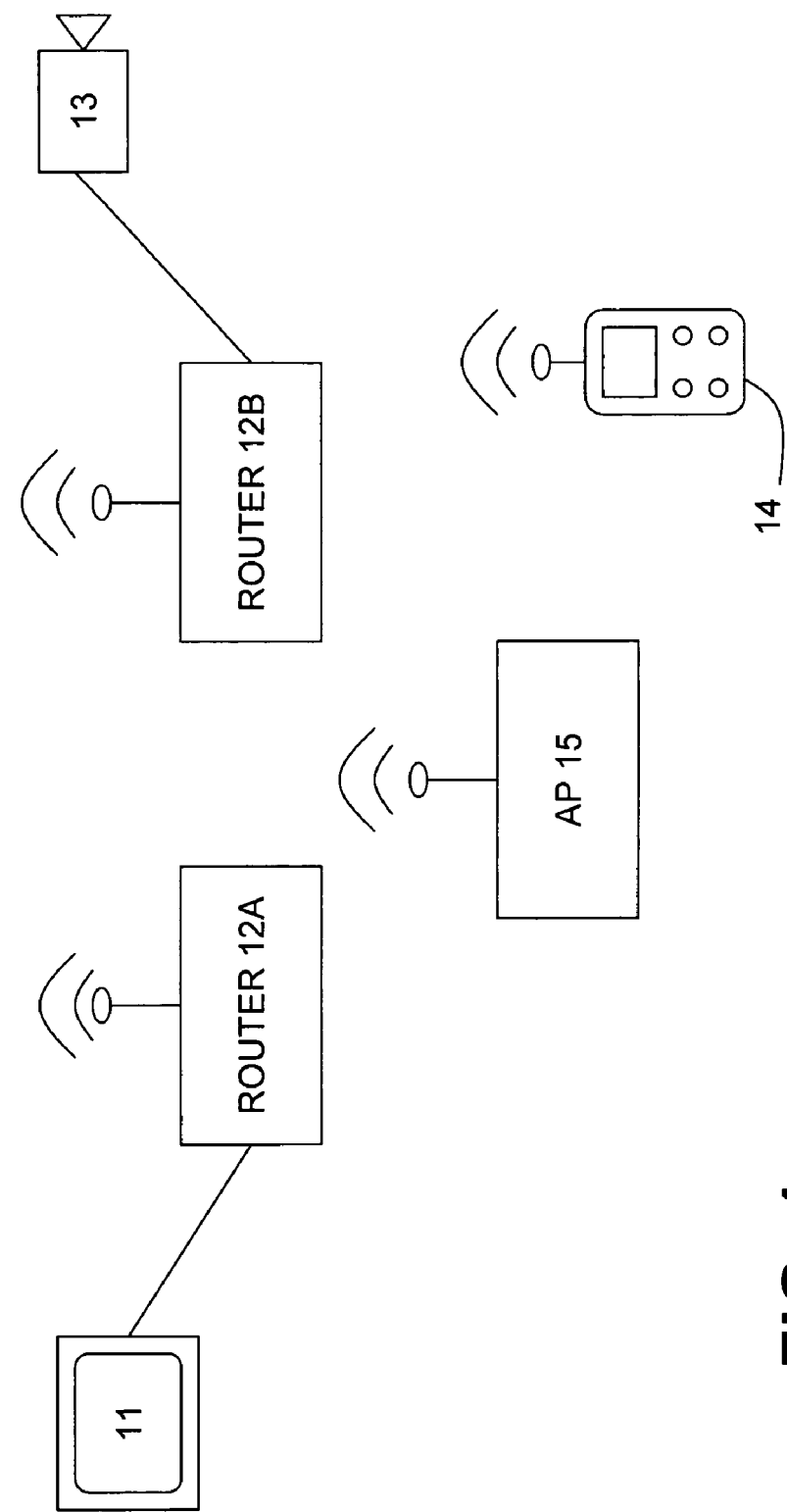
FIG. 1 is a diagram showing a wireless network and associated mobile, wireless devices.

Wireless networks such as WN 10 in FIG. 1 are typically deployed in environments where it is either problematic to link network devices by wired means or where it is merely convenient and expedient to deploy a wireless as opposed to a wired network. Wireless communications networks are deployed within buildings, between buildings that are proximate to each other in a campus setting for instance and in metropolitan areas to support mobile communications for metropolitan safety organizations. One of the draw backs in depending upon a wireless communications network is that the signals that are transmitted and received by the wireless network infrastructure devices are susceptible to different types of interference (multi-path, other wireless signals, or RFI in general) and as the result of moving in and out of range of the wireless network infrastructure devices, the signal strength either improves or degrades. In order to mitigate these problems, wireless transmission technologies, such as the 802.11 and the 802.16 families of standards have been extended to support a number of packet transmission rates using a number of different modulation schemes. So, for instance, the IEEE 802.11b standard specifies support for transmission rates of 1 Mbps, 2 Mbps, 5.5 Mbps and 11 Mbps, each rate of which can be selected depending upon the environment in which a mobile device exists and depending upon how far from a wireless network access point or router the mobile device is. Rate adaptation methods exist and are implemented in wireless, mobile devices which automatically change the packet transmission rate from a current to a new transmission rate depending upon signal-to-noise measurements or the signal strength measurements. While such rate adaptation methods work well for certain types of audio communications and file transfer applications, they are not designed to operate in conjunction with real-time video applications. Real-time video applications are typically much more sensitive to packet delay and packet loss than they are to the overall throughput of the network, and so rate adaptation methods designed to optimize throughput typically do not work well in conjunction with real-time video applications.

FIG. 1 illustrates a wireless communications network (WN 10), that includes a video monitor 11, video camera 13, a wireless, mobile communications device 14, two wireless routers 12A and 12B and a wireless access point (AP) 15. The wireless routers 12A and 12B and the wireless AP 15 are each capable of transmitting and receiving packets of video, voice, data and other information such as management information for instance. The routers 12A and 12B can be configured in a mesh network topology or in a point-to-point topology; regardless, the particular network topology that is employed here is not important for the operation of the invention. WN 10 can be any type of public or private network such as a cellular network or a metropolitan network operated by a governmental agency for instance. Although the invention is described as being implemented in a wireless communications device that employs the IEEE 802.11 standards protocol, the invention can just as easily be implemented in conjunction with many other wireless communication protocols. The wireless communication device 14 can be a mobile phone or any intelligent, wireless communication device able to transmit and receive video, audio or other information. Generally, the WN 10 operates to support wireless communication sessions established by a wireless communication device, such as device 14. The WN 10 operates to support the transmission of packets of video information captured by a device such as the video camera 13, and it operates to support the transmission of information, video or audio, that is generated and transmitted by other types of capture or communication devices. Specifically, both of the routers 12A and 12B and the AP 15 included in the WN 10 can be configured to support the transmission of packets of video information generated by a real-time video application that can run on the video capture device 13 or the mobile communications device 14, for instance. The routers 12A and 12B, the AP 15 and the mobile communications device 14 can all support the transmission of packets according to the 802.11b protocol or according to any other appropriate wireless protocol that is designed to operate at two or more different packet transmission rates. According to one embodiment of the invention, each of the routers 12A and 12B, the AP 15 and the mobile communications device 14 include a novel packet transmission rate adaptation method that operates to support the transmission of video packets generated by a real-time video application, such as a video conferencing application, a video capture application running on a mobile phone, video surveillance or VoIP such that the packet transmission loss rate is minimized.

Figure 2:
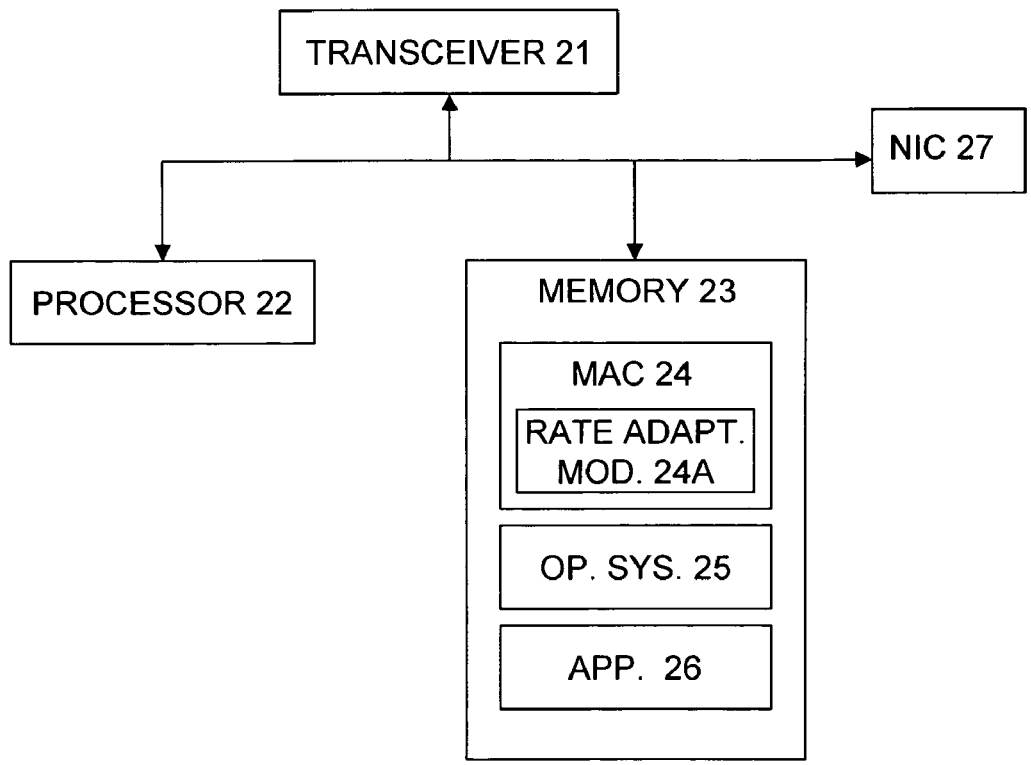
FIG. 2 is a block diagram of a wireless router showing the functionality needed to implement the invention.

FIG. 2 shows the functional elements necessary to implement the method of the invention. Although the invention will be described in the context of a wireless router 20, it can also be implemented in a mobile communications device or a wireless access point such as those described previously with reference to FIG. 1. The wireless router 20 includes a transceiver or radio 21, a processor 22, a memory 23 and a network interface connection element 27 all of which are in communication with each other over a system bus. Memory 23 includes, among other things, a medium access control (MAC) module 24, an operating system module 25 and a real-time video processing application module 26 which can be a video conferencing application, an integrated video surveillance application or a long-term security video surveillance recording application for instance. In general, the processor 22 employs instructions stored in the operating system module 25 to run the various functions needed for the router 20 operate. The transceiver 21 operates to transmit and receive signals to and from the wireless medium and typically implements functionality commonly referred to as the 802.11 physical layer. The physical layer can include functionality that supports the transmission of packets of information at multiple different transmission rates with some or all of the rates implemented using different modulation schemes such as the well known BPSK, QPSK or OFDM modulation schemes. As will be described later in detail, the physical layer functionality operates under the control of the MAC 24 to transmit packets at a transmission rate so as to minimize a packet transmission loss rate.

Continuing to refer to FIG. 2, the video application 26 includes all of the functionality that the router 20 needs in order to capture video information, to convert the video information into a form that can be handled by the router 20 such as encoding/decoding the video information, and framing and packetizing the video information and generally preparing the video information to be transmitted over the wireless medium. This application can run on a video conferencing system or a video capture application running on a mobile phone or some other type of intelligent, mobile communications device. As described earlier, the method of the invention is implemented in the MAC 24 and specifically it is implemented in a management entity 24A associated with the MAC 24 which will be described in detail later. Typically, certain packet transmission parameters are specified for real-time video applications which should be met for the application to operate in an optimal manner. One of these parameters is a maximum packet delay (Dmax) value and another is a maximum packet loss (Lmax) value. Packet delay (D) refers to the period of time between the end of the transmission of one packet and the beginning of the transmission of the next packet. Depending upon the channel conditions, this delay can be a longer or a shorter period of time and is largely dependent upon the number of times a packet or frame has to be retransmitted before the transmission is successful. So, for instance, in a noisy environment, it can be necessary to retransmit a particular packet five times before it is successfully transmitted or in the case were the channel conditions are good the packet may be successfully transmitted on the first attempt and so the delay will be much shorter. Packet loss (L) refers to the number of packets that are unsuccessfully transmitted during a particular period of time and can be expressed as a packet transmission loss rate. The novel packet transmission rate adaptation method of the invention operates to minimize the rate at which packets are lost while maintaining an acceptable packet transmission rate for real-time video traffic. Further, the method of the invention operates to adaptively change the packet transmission rate (Rate$_i$) as a direct consequence of a current packet loss rate (L) and indirectly as a consequence of a selected maximum packet delay parameter (Dmax). As will be described below, Dmax is used to calculate, for each Rate$_i$ supported by the WN 10, the maximum number of times a single packet can be retransmitted (N$_i$) without violating a specified Dmax parameter. Then, given the calculated N$_i$ for a particular Rate$_i$ and a maximum packet loss parameter or budget (Lmax), an upper boundary or limit for the packet loss rate (L$_i$) can be calculated. Two equations, described below, are used to calculate the values of both N$_i$ and L$_i$. To implement the method of the invention, the values for Dmax and Lmax are distributed to each of the communication devices, such as router 20, included in the WN 10 and used by each device to calculate the N$_i$ and L$_i$, values that are employed by the novel rate adaptation method.

The Dmax value specified for a particular application can be stored in memory 23 of router 20 and is a limit employed by the novel rate adaptation method in conjunction with Equation 1 to calculate a maximum retransmission value (N$_i$). Equation 1 as shown $$D = \sum_{n=0}^{N_i} \left( NetOd + MacOd + PhyOd + \frac{frameS}{rate_i} \right) \leq D_{max} \qquad \text{Equation 1:}$$

includes four fundamental transmission time values, three of which are associated with sending overhead included in a frame/packet at three different levels of the 802.11 protocol stack and one of which is associated with the transmission time value for sending the payload associated with the frame, which in this case is video information. The first term in Equation 1 is "NetOd" and represents the time it takes for the router 20 of FIG. 2, for instance, to transmit the overhead associated with a network level frame which includes network frame header information. The second term in Equation 1 is "MacOd" and represents the time it takes for the router 20 to transmit the overhead associated with header information included in a MAC frame. The third term in Equation 1 is "PhyOd" and represents the time it takes for the router 20 to transmit the overhead associated with the physical layer and the forth term "frameS/rate$_i$" represents the time it takes for the router 20 to transmit the video information included in the payload portion of the frame. Although not shown in Equation 1, there can be other transmission delay elements included in the Dmax limit, at least some of these elements can be such things as a DIFS and a SIFS time, an ACK time, contention window times, end-to-end propagation delay, and a slot time all of which times are well known to wireless network engineers and so will not be described here.

In order to calculate the frame or packet retransmission limit (N$_i$), the number of bits included in the payload portion of a frame "frameS" is divided by a selected frame transmission rate (rate$_i$), such as the 5.5 Mbps rate, to arrive at a value for the time is takes to transmit the payload. This payload transmission time "frameS/rate$_i$" and the values of "NetOd", "MacOd" and "PhyOd" are entered into the Equation 1. The number of permitted frame retransmissions can then be arrived at as the value of "N$_i$" that satisfies Equation 1 such that the quantify [NetOd+MacOd+PhyOd+FrameS/rate$_i$], which will be referred to here as "D", is less than or equal to the specified Dmax value for the selected transmission rate. Equation 1 is evaluated for each of the frame/packet transmission rates supported by the router 20 to arrive at the values of "N$_i$" associated with each of the supported rates, and these values of "N$_i$" are stored in memory 23 for later use.

After calculating separate values of "N$_i$" for each supported transmission rates, each of these "N$_i$" values are used to calculate an upper frame loss rate boundary or limit (L$_i$) for each supported transmission rate using Equation 2 shown below.

$$L_i^{N_i} \leq L_{max} \qquad \text{Equation 2:}$$

Given the value of "N$_i$" as the result of evaluating Equation 1 for each supported transmission rate (rate$_i$) and the specified value for Lmax, Equation 2 can be evaluated for the packet loss limit value "L$_i$" at each supported rate The calculated values for "L$_i$" and "N$_i$" at each of the selected or supported rates are then stored in memory 23 of the router 20 described with reference to FIG. 2 for use by the rate adaptation module 24A associated with MAC 23A to enable the frame transmission rate adaptation method of the invention.

Typically, video conferencing applications specify a Dmax value of 200 ms and an Lmax value of three percent (3%), integrated video surveillance, motion detection and alerting systems typically specify a Dmax value of 1 sec and an Lmax value of one percent (1%) and long-term security video surveillance recording application typically specify a Dmax value of 3 s and an Lmax value of one-half of one percent (0.5%). So for example, assuming that the time it takes to transmit the frame overhead and payload at the 2 Mbit transmission rate is 14 ms, and that the number of hops in the WN 10 is three, evaluating Equation 1 for "N$_i$" based on the Dmax value of 66 msec (200 ms/3 hops) specified for a video conferencing system results in an "N$_i$" value of no greater than 4. This means that the router 20 of FIG. 2 can attempt to retransmit each frame of video information four times without violating the specified Dmax value for the application. Now, using the value of "$N_i$" which is equal to "4" and the specified value of Lmax for a video conferencing system, which can be three percent (3%), Equation 2 can be evaluated for the upper frame loss boundary "$L_i$" for the 2 Mbps transmission rate which in this case is 41%. In other words, the video conferencing application can fail to transmit forty one percent of the frames successfully and can still operate properly or without any perceptible errors. Repetitively evaluating Equations 1 and 2 at each of the different supported transmission rates results in a collection of related RATE, "$N_i$" and "$L_i$" values that are shown in Chart 1 below.

CHART 1

| RATE | "$N_i$" | "$L_i$" |
| --- | --- | --- |
| 1 Mbps | 2 | 17% |
| 2 Mbps | 4 | 41% |
| 5.5 Mbps | 11 | 72% |
| 11 Mbps | 23 | 85% |

As previously described, the Ni and Li values shown in Chart 1 are calculated by the rate adaptation module 24A and then stored in memory 23 in each of the communications devices included in WN 10, such as the routers 12A, 12B, AP15 and mobile device 14 and are used by the MAC 24 to provide the functionality according to the method of the invention. Additionally, the rate adaptation module 24A derives a frame loss estimate value "L" which is a maximum likelihood estimate of the actual frame transmission loss rate, which estimated rate can be based on the ratio "F/F+S" with the term "F" equivalent to the number of failed frame transmission attempts and the term "S" equivalent to the number of successful frame transmission attempts as detected by the transceiver 21 and reported to the MAC 24. The frame transmission loss rate "L" is derived based on the number of successfully and unsuccessfully transmitted frames detected by router 20 for the most recent "W" frames of the same transmission rate (referred to as an estimate cause only X frames are sampled which is a small sample in relationship to the number of frames that could be sampled to determine the rate). In one embodiment, the time window "W" is configured as the total number of transmissions that a certain number of recent packets experience. "W" can be set to detect the number of times a predetermined number of packets are attempted to be transmitted/retransmitted. The value for "W" can be set to a higher or lower predetermined number of packets depending upon whether the channel conditions are poor or are good respectively. The strategy in setting "W" to be larger when the channel conditions are poor is the result of the need to err on the side of caution in the presence of improving channel conditions so that the transmission rate is not prematurely increased, which might result in unacceptable frame losses.

Figure 3:
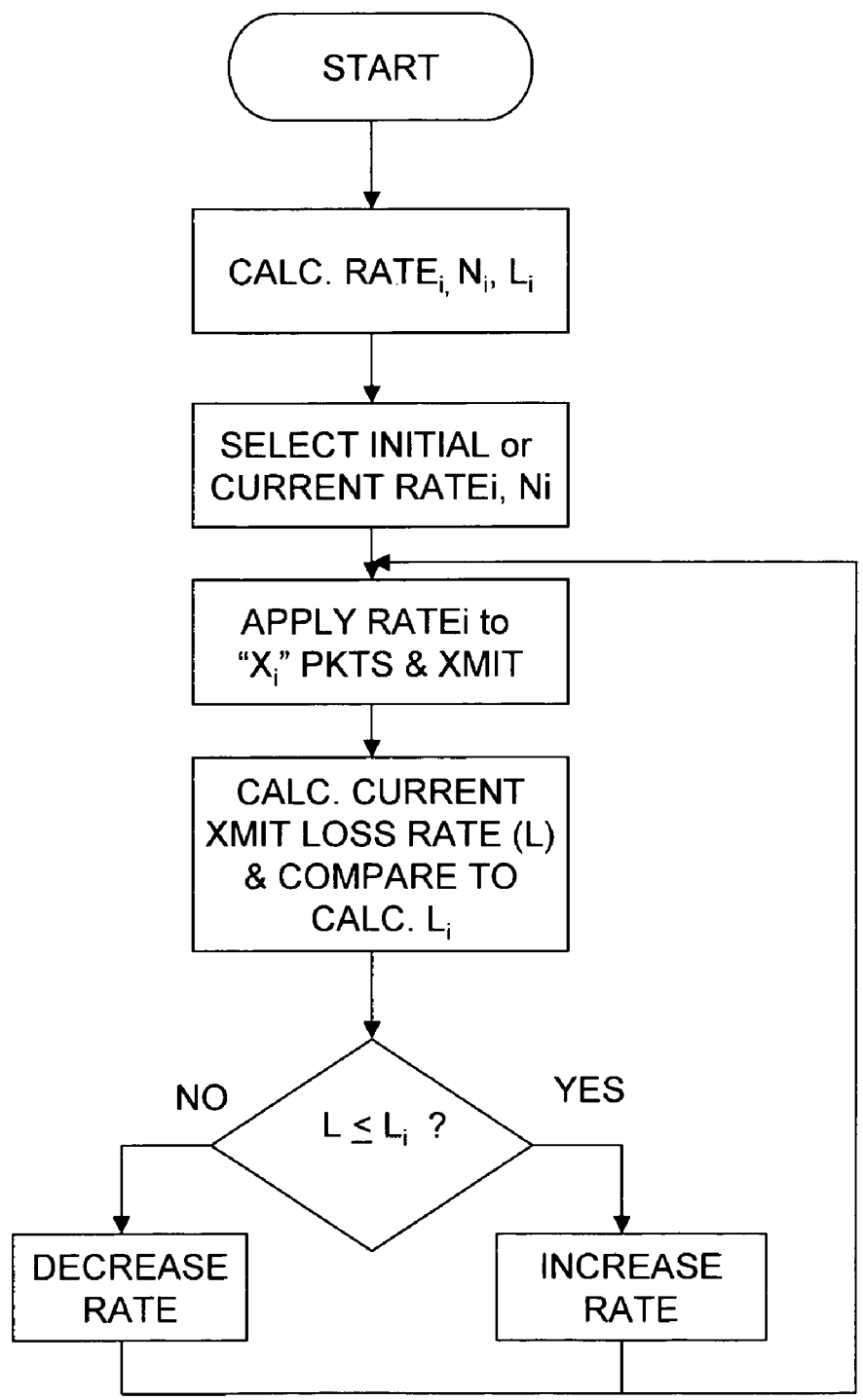
FIG. 3 is a logical flow diagram of the method of the invention.

The process that is employed to practice the preferred embodiment of the invention will now be described with reference to FIG. 3. In step 1, the Dmax and the Lmax values are distributed to the communication device included in the WN 10 that are responsible for transmitting and receiving packets of real-time video information and which support a plurality of packet/frame transmission rates. Each of the communication devices, such as the router 20 for instance, receive the Dmax and Lmax values and proceed to use these values to calculate for each supported transmission rate a value for "$L_i$" and a value for "$N_i$". These values are stored in memory 23 for later use by the rate adaptation module 24A. In step 2, an initial frame transmission rate, 2 Mbps for instance, is selected by the MAC 24, and in step 3 this 2 Mbps transmission rate is applied to some number "$X_n$" of packets that are already queued up for transmission by the transceiver. The transceiver is also set to, upon frame transmission failures, retransmit the frame up to the upper limit pre-calculated for the 2 Mbps transmission rate, which in this case is 4 retries. In step 4, the transceiver proceeds to transmit the "$X_n$" packets of video information at the current 2 Mbps rate, records the number of successfully and unsuccessfully transmitted frames and uses this recorded transmission success information to calculate the current frame transmission loss rate "L" as was described earlier. The calculated frame loss rate estimate "L" is compared to the pre-calculated frame transmission loss rate limit (Li) corresponding to the 2 Mbps transmission rate, and in Step 5 determines whether the current "L" value is less than or equal to the "Li" value. If the current "L" value is compared to be less than or equal to the "Li" value, then the process proceeds to step 6A, otherwise the process proceeds to step 6B. In step 6A the rate is increased from the current 2 Mbps rate to the new 5.5 Mbps transmission rate and this rate is applied to the transceiver 21 transmit queue and the process returns to step 3. In the event that in step 5 it is not true that the current "L" value is less than or equal to the "Li" value (it would be greater than Lmax), then the new transmission rate is set to be lower than the current 2 Mbps rate which in this case is the 1 Mbps transmission rate and this new 1 Mbps rate is applied to the transceiver 21 queue and the process returns to step 3.

Referring back to step 3 of FIG. 3, one of the risks associated with changing the transmission rate from a lower to higher rate is that the packet/frame loss rate experienced at this new, higher rate may be in excess of the packet transmission loss boundary "Li" pre-calculated for that rate. One way to mitigate this problem is to very quickly provide feedback to the rate adaptation module 24A that allows the module 24A to assess this risk and respond accordingly. However, as "$X_n$" packets are already buffered in the transceivers transmission queue and assigned a transmission rate, all of these packets have to be sent before a new, higher rate can be applied to packets for enqueueing and transmission at the new, higher rate. As the result, there will be a delay equal to the time it takes to transmit the "$X_n$" packets buffered in the queue at the current rate before packets can be transmitted at the new, higher rate. This delay can result in transmission rate instability and/or can result in the "$X_n$" packets buffered in the queue being lost. The method of the invention solves this rate instability problem by progressively and incrementally applying the new rate and corresponding packet retransmission upper bound "$N_i$" to only a sub-set of the "$X_n$" packets queued for transmission in the transceiver 21. More specifically, at the point in time that the rate adaptation process determines that packets can be transmitted at a higher rate, it can apply this new, higher rate to only a first sub-set of the number of packets, "$X_n$", that the queue can buffer at any single point in time, and then re-apply the lower, old rate to the rest of the "$X_n$" packets or to a second sub-set of the "$X_n$" packets. The rate adaptation process maintains a record of the packet loss rates with respect to the first sub-set of packets sent at the new, higher rate and the second sub-set of packets send at the old, lower rate to determine whether the packet loss rate at the new, higher rate is within the calculated packet loss boundary "L" for the new, higher rate. This incremental rate adaptation strategy results in the avoidance of premature rate changes and avoids bursty, transient packet losses that can be catastrophic for real-time video traffic or other traffic transport.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

We claim:

1. A method for controlling a packet transmission rate in a wireless communications device comprising:
   calculating a packet retransmission limit and a packet transmission loss rate limit for each of a plurality of packet transmission rates;
   setting the wireless communications device to transmit at a current packet transmission rate selected from the plurality of packet transmission rates;
   setting an initial packet retransmission limit to be the calculated retransmission limit associated with the selected packet transmission rate;
   detecting packet transmission failures and successes over a period of time during which a selected number of packets are transmitted;
   determining a current packet transmission loss rate based on the number of detected packet transmission failures and successes;
   comparing the current packet transmission loss rate with the calculated packet transmission loss rate limit; and
   changing the packet transmission rate to a higher packet transmission rate if the current packet transmission loss rate is less than the calculated packet transmission loss rate limit.

2. The method of claim 1 wherein the packet includes one of voice information and video information and data information.

3. The method of claim 1 wherein the wireless communications device is one of a wireless router, a wireless access point, and a mobile communications device.

4. The method of claim 1 wherein the packet retransmission limit is less than a specified maximum packet delay and the packet transmission loss rate limit is less than a maximum packet loss limit.

5. The method of claim 1 wherein changing the packet transmission rate is further comprised of alternating the packet transmission rate applied to one or more packets between the current packet transmission rate and the higher packet transmission rate until the current packet transmission loss rate is compared to be less than the calculated packet transmission loss rate for the higher packet transmission rate.

6. The method of claim 1 wherein the period of time over which transmission failures and successes are detected is equivalent to the time it takes to transmit a selected number of packets.

7. The method of claim 6 wherein the selected number of packets is greater than a predetermined number of packets if the current packet transmission loss rate is compared to be greater than the calculated packet transmission loss rate.

8. The method of claim 6 wherein the selected number of packets is less than a predetermined number of packets if the current packet transmission loss rate is compared to be less than the calculated packet transmission loss rate.

9. The method of claim 6 wherein the predetermined number of packets is six.

10. A wireless communication device comprising:
    a transceiver;
    a processor; and
    a memory which includes a communications module and a Media Access Control (MAC) module, the MAC module operating on packets of information generated by the communications module to
    calculate a packet retransmission limit and a packet transmission loss rate limit for each of a plurality of packet transmission rates,
    set the wireless communications device to transmit at a current packet transmission rate selected from the plurality of packet transmission rates,
    set an initial packet retransmission limit to be the calculated retransmission limit associated with the selected initial packet transmission rate,
    detect packet transmission failures and successes over a period of time during which a selected number of packets are transmitted,
    determine a current packet transmission loss rate based on the number of detected packet transmission failures and successes,
    compare the current packet transmission loss rate with the calculated packet transmission loss rate limit, and
    change the packet transmission rate to a higher packet transmission rate if the current packet transmission loss rate is less than the calculated packet transmission loss rate limit.

11. The wireless communication device of claim 10 wherein the packet includes one of voice information and video information and data information.

12. The wireless communication device of claim 10 wherein the wireless communications device is one of a wireless router, a wireless access point, and a mobile communications device.

13. The wireless communication device of claim 10 wherein the packet retransmission limit value is less than a maximum packet delay value and the packet transmission loss rate limit is less than a maximum packet loss limit.

14. The wireless communication device of claim 10 wherein changing the packet transmission rate by the MAC module is further comprised of alternating the packet transmission rate applied to one or more packets between the current packet transmission rate and the higher packet transmission rate until the current packet transmission loss rate is compared to be less than the calculated packet transmission loss rate for the higher packet transmission rate.

15. The wireless communication device of claim 10 wherein the selected number of packets is greater than a predetermined number of packets if the current packet transmission loss rate is compared to be greater than the calculated packet transmission loss rate.

16. The wireless communication device of claim 10 wherein the selected number of packets is less than a predetermined number of packets if the current packet transmission loss rate is compared to be less than the calculated packet transmission loss rate.

17. The wireless communication device of claim 10 wherein the predetermined number of packets is any number of packets in the range from 4 to 23.

* * * * *